United States Patent [19]

Matsuo et al.

[11] Patent Number: 5,004,580
[45] Date of Patent: Apr. 2, 1991

[54] METHOD AND APPARATUS FOR PACKING PERMANENT MAGNET POWDER

[75] Inventors: Yoshio Matsuo; Hirofumi Nakano, both of Toyohashi; Masakuni Kamiya, Hamamatsu; Kezuo Matsui, Toyohashi, all of Japan

[73] Assignee: Fuji Electrochemcial Co. Ltd., Tokyo, Japan

[21] Appl. No.: 508,421

[22] Filed: Apr. 13, 1990

[30] Foreign Application Priority Data

Apr. 15, 1989 [JP] Japan .................................. 1-95916
Apr. 24, 1989 [JP] Japan ................................. 1-104056

[51] Int. Cl.$^5$ ............................................. B22F 1/00
[52] U.S. Cl. ........................................ 419/65; 419/32; 419/38; 419/66; 148/103; 148/104; 148/105; 148/108
[58] Field of Search ............ 419/38, 32, 66, 65; 148/103, 104, 105, 108

[56] References Cited

U.S. PATENT DOCUMENTS

| | | | |
|---|---|---|---|
| 4,592,889 | 6/1986 | Leupold et al. | 419/66 |
| 4,600,555 | 7/1986 | Shimizu | 419/5 |
| 4,678,634 | 7/1987 | Tawara et al. | 419/30 |
| 4,734,253 | 3/1988 | Sato et al. | 419/30 |
| 4,776,902 | 10/1988 | Ghandehari | 419/38 |
| 4,911,882 | 3/1990 | Greewald | 419/12 |
| 4,931,092 | 6/1990 | Cisar et al. | 75/244 |

*Primary Examiner*—Brooks H. Hunt
*Assistant Examiner*—Leon Nigohosian, Jr.
*Attorney, Agent, or Firm*—Fleit, Jacobson, Cohn, Price, Holman & Stern

[57] ABSTRACT

A method and apparatus for packing a permanent magnet powder wherein a solenoid coil is provided near the opening of a cylindrical molding space of a mold in such a manner that the direction of the central axis of the solenoid coil substantially coincides with the central axis of the molding space, and an alternating current magnetic field is applied, so that a permanent magnet powder above the opening is packed into the molding space. A magnetic pole may be provided in the center of the solenoid coil. The method of the present invention can be applied to not only a powder for a sintered magnet but also a powder for a bonded magnet.

10 Claims, 1 Drawing Sheet

METHOD AND APPARATUS FOR PACKING PERMANENT MAGNET POWDER

BACKGROUND OF THE INVENTION

The present invention relates to a technique for packing a permanent magnet powder uniformly in a cylindrical molding space provided in a mold.

This technique can be utilized for molding of rare earth, ferrite and metallic magnets, production of a bonded magnet, etc. A method which comprises packing a permanent magnet powder into a molding space of a mold and subjecting the packed powder to compression molding with a pressing machine has been generally adopted for molding of a permanent magnet pole for the purpose of developing excellent magnetic charcteristics.

In conventional compression molding, the packing of the permanent magnet powder into the molding space of the mold has been exclusively conducted by taking advantage of gravity drop. Specifically, in a general method of packing powder, a predetermined amount of a powder is supplied into a molding space of a die by leveling in such a manner that a powder is dropped by gravity through the opening of a molding space by a bottomless powder feeding mechanism sliding on the top surface of a die which constitutes a mold and the powder feeding mechanism is then slid to remove excess powder.

When the area of the opening of the molding space of the mold is considerably large, it is possible to pack the powder by the above-described method. However, for example, in the case of a thin-wall cylindrical molding space having a small opening width, it is difficult to conduct sufficient packing through mere sliding of the powder feed mechanism along the top surface of the mold.

For this reason, other methods are sometimes adopted such as one wherein packing is conducted by vibrating the mold and one wherein a blade for forced packing (forcing member) is provided on the upper part of the molding space to force the powder into the molding space.

The method wherein packing is conducted by vibrating the mold has drawbacks such as high susceptibility to variation in the packing rate depending upon the state and shape of powder, risk of fastening of an apparatus with a bolt etc. to be loosened due to the vibration, poor improvement in the packing efficiency, and poor reproducibility of the amount of packing.

The method wherein forced packing is conducted with a blade has drawbacks such as very poor production efficiency due to not only a necessity of long period of time for packing but also difficulty of automating the packing of powder in the step of pressing, localized ocurrence of a difference in the shape between the packed powder and the powder before packing due to forcing of the powder by the blade which makes it difficult to conduct uniform packing of a predetermined amount of powder and therefore brings about a variation in the weight of the packed powder and nonuniform density distribution during molding.

SUMMARY OF THE INVENTION

An object of the present invention is to eliminate the above-described drawbacks of the prior art.

Another object of the present invention is to provide a technique for packing a permanent magnet powder which enables a predetermined amount of permanent magnet powder to be uniformly packed into a thin-wall cylindrical molding space in a very short period of time.

A further object of the present invention is to provide a new method production of a permanent magnet having excellent magnet characteristics.

Another object of the present invention is to provide a new method and a new apparatus which can be immediately applied to existing press molding machines.

The above-described objects of the present invention can be attained by a method of packing a permanent magnet powder wherein a solenoid coil is provided near the opening of a cylindrical molding space of a mold in such a manner that the central axis is aligned with a central axis of the cylindrical molding space. In this case, it is preferred to provide a truncated cone-shaped magnetic pole wherein the diameter of the top surface is 1/6 or more of, but less than, that of the bottom surface and the diameter of the bottom surface is identical or slightly smaller than that of the bottom rod of the mold constituting the cylindrical molding space on the central axis of the solenoid coil and to apply an alternating current to cause a permanent magnet powder located above the above-described opening to be magnetically attracted and packed into the above-described molding space.

The method of packing a permanent magnet powder in the present invention comprises the steps of providing a solenoid coil near an opening of a cylindrical molding space of a mold in such a manner that the central axis of the solenoid coil is aligned with a central axis of the cylindrical molding space, supplying a permanent magnet powder above the opening of the cylindrical molding space of the mold, and applying an alternating current magnetic field, thereby packing the permanent magnet powder into the molding space.

The apparatus for packing a permanent magnet powder comprises a solenoid coil, and a magnetic pole member along a central axis of the solenoid coil, the magnetic pole memebr having a truncated cone shape, wherein a diameter of a top surface of the magnetic pole member is 1/6 or more of, but less than, that of the bottom surface thereof and the diameter of the bottom surface is identical to or slightly smaller than that of a bottom rod of a mold, the mold having a cylindrical molding space.

BRIEF DESCRIPTION OF THE DRAWINGS

The invention will now be described in detail with reference to the accompanying drawings wherein.

DESCRIPTION OF THE PREFERRED EMBODIMENTS

Figure 1:
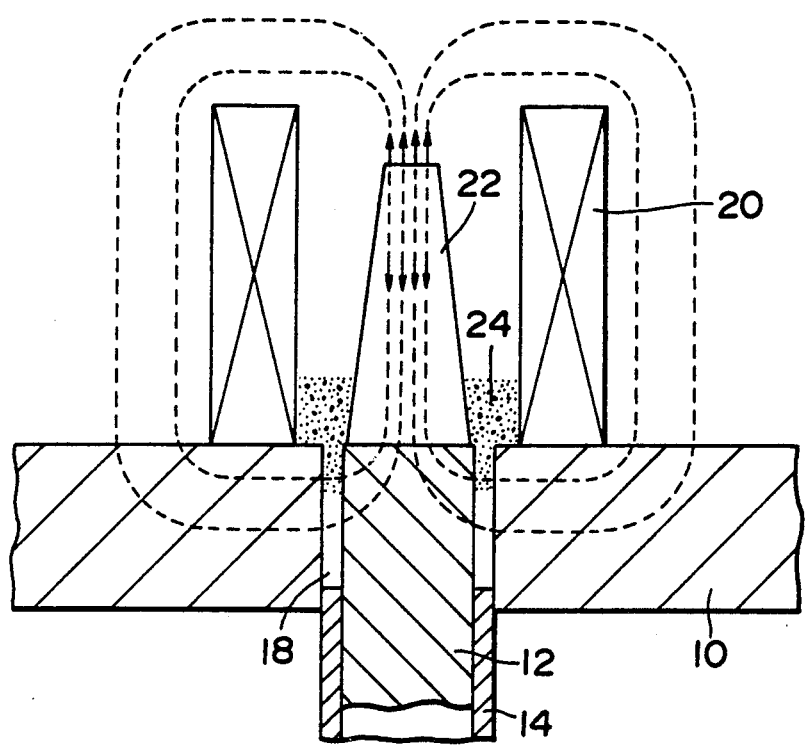
FIG. 1 is a diagrammatic cross-sectional view of a mold and a solenoid coil for packing according to the present invention and showing lines of magnetic force.

The term "cylindrical" used herein is intended to include not only a shape having a longer axial length but also an annular shape having a shorter axial length.

The method of the present invention can be practiced by making use of e.g., an apparatus wherein a solenoid coil and a magnetic pole are integrally coupled to each other through a linking member.

The magnetic pole is of the form of a truncated cone for the purpose of smoothly packing the permanent magnet powder into the cylindrical molding space. The reason why the diameter of the top surface of the magnetic pole must be 1/6 or more of, but less than, that of the bottom surface is that when this ratio is less than 1/6, magnetic saturation tends to occur around the top surface with the result that the magnetic field applied to the molds is small, and consequently the force for attracting and forcing the powder into the molding space is weakened. The reason why the diameter of the bottom surface of the magnetic pole must be identical to or slightly smaller than that of the bottom rod of the mold is that when the diameter of the bottom surface is excessively small, the magnetic pole becomes slim, which tends to bring about the magnetic saturation. Although the diameter of the bottom surface of the magnetic pole can be formed identical to that of the bottom rod of the mold, it is preferred that the diameter of the bottom surface be slightly smaller than that of the bottom rod so that the magnetic pole, which is moved on the molding die when powder is supplied and molded, does not prevent powder-supply and molding by an upper punch.

Any of permanent magnet powders such as samarium-cobalt base, ferrite-base, alnico-base and neodymium-iron-boron-base magnet powders may be used in the present invention. Further, it is also possible to use a powder having any particle diameter and in any state. Specifically, the powder may be one for a sintered magnet or one kneaded with a resin for use in a bonded magnet.

As is well known, permanent magnet powders having a given coercive force are sensitive to a magnetic field. It is a matter of course that these permanent magnet powders are attracted in the direction of a strong magnetic field. Accordingly, if a solenoid coil is provided near the opening of the molding space of the mold in such a manner that the central axis substantially corresponds to the direction of the depth of the molding space and an alternating current is supplied, an alternating current magnetic field is applied, so that a moving force is impaired to the permanent magnet powder. Since a magnetic pole is provided in the center of the solenoid coil, there occurs a concentration of the magnetic field by the magnetic pole, so that a sufficiently large moving force can be imparted to the permanent magnet powder even when the supplied current is small.

This moving force acts in such a direction that the permanent magnet powder is attracted into the molding space, and the permanent magnet powder is successively packed into the molding space. Since packing is conducted by a magnet force which is much larger than the force derived from gravity drop, the permanent magnet powder is smoothly packed in a very short period of time even when the opening width of the molding space of the mold is very small. Further, as opposed to the conventional method wherein packing is forcibly conducted by a blade etc., the permanent magnet powder is substantially uniformly packed without being broken.

Since the magnetic pole has a predetermined ratio of the diameter of the top surface to that of the bottom surface and the bottom surface is of the form of a truncated cone having a dimension determined according to the bottom rod of the mold, the permanent magnet powder can be smoothly packed even when the cylindrical molding space has a thin-wall structure for a thin wall permanent magnet.

FIG. 1 is an illustrative view of one embodiment of an apparatus suitable for practicing the method of the present invention. Part of a mold for preparing a cylindrical molding is shown in this drawing. This mold comprises a die 10 having a circular hole 11 in the center, a bottom rod 12 provided in the center of the hole while leaving a molding space 18 and a cylindrical bottom punch 14 which is freely slidable vertically within the molding space, or cylindrical gap between the die 10 and the bottom rod 12. The cylindrical gap formed by the three members 10, 12 and 14 constitutes the molding space 18. A permanent magnet powder 24 is packed within the molding space 18 and a cylindrical top punch (not shown) is inserted thereinto from the upper part of the space to apply a pressure for compression molding. The mold structure of the above-described press molding machine is fundamentally the same as that of the conventional one.

In the present invention, a solenoid coil 20 is provided near the opening 15 of the molding space 18 of the mold. In the illustrated embodiment, the solenoid coil 20 is provided in such a manner that the direction of the central axis thereof substantially coincides with the central axis of the molding space extending in the direction of the depth of the molding space 18, and the inner diameter of the solenoid coil is slightly larger than the outer diameter of the molding space 18. A magnetic pole 22 made of pure iron is provided on the bottom rod 12 extending along the central axis of the above-described solenoid coil 20. This magnetic pole 22 has the shape of a truncated cone wherein the diameter (refer to FIG. 2), $D_1$, of the bottom surface is identical to or slightly smaller that that of the bottom rod 12 and the diameter, $D_2$, of the top surface is 1/6 or more of, but less than, the diameter $D_1$, of the bottom surface (i.e., $D_2 D_1$ and $D_1/6 \leq D_2$). The solenoid coil 20 and the magnetic pole 22 are integrally joined to each other with a non-magnetic linking member (not shown) in such a manner that they can be moved unitarily in order to conduct the packing of the powder.

In this embodiment, among the members constituting the mold, the die 10 and the bottom rod 12 are made of a magnetic material, while the bottom punch 14 (also the top punch) is made of a non-magnetic material.

The permenent magnet powder is packed as shown in FIG. 1. Specifically, as described above, the solenoid coil 20 and the magnetic pole 22 are mounted near the opening of the molding space 18 of the mold, and a permanent magnet powder 24 is piled up above the molding space 18. Then, an alternating current is supplied to the solenoid coil 20. The magnetic field thus applied is 5 Oe or more, and the frequency of the alternating current used is 10 Hz or more. The flow of an alternating current through the solenoid coil 20 brings about a line of magnetic force as indicated by broken lines in FIG. 1 of the drawing, so that an alternating current magnetic field is produced in the permanent magnet powder 24, the molding space 18, etc. The magnetic pole 22 can concentrate the alternating current magnetic field in the molding space 18, which can effectively magnetically attract the permanent magnet powder 24 into the molding space 18 even when the applied electric current is weak. For convenience, the form of the lines of magnetic force indicated by the broken lines in the drawing shows an approximate route of the lines of magnetic force. The magnetic flux generated by the solenoid coil 20 is collected by the magnetic pole 22, passed through the bottom rod 12 and the die 10, and passed along the outside of the solenoid coil 20, and then returned to the magnetic pole 22. When an alternating current magnetic field is applied to the permanent magnet powder 24 piled upon the upper part of the molding space 18, as illustrated in FIG. 1, the magnetic flux density of the cylindrical molding space 18 becomes larger than that of the portion where the powder is piled up, and consequently the difference in the magnetic flux density causes the powder to be magnetically attracted into the cylindrical molding space 18. The permanent magnet powder 24 remaining on the die 10 as well responds to the alternating current magnetic field to repeat a complicated vibration, whereby the powder is completely packed into the gap in a short period of time (with several seconds) even when the gap is very narrow.

Thereafter, if necessary, an excess permanent magnet powder is removed be leveling etc., and the top punch 20 is descended topress the packed powder for compression molding.

The above-described specific shape of the magnetic pole 22 in the present invention is employed as the results of the following experiment. The amount of the permenent magnet powder packed into the cylindrical molding space was measured by using seven magnetic poles wherein the height, H, and the diameter, $D_1$, of the bottom surface were set constant to 50 mm and 18 mm$\phi$, respectively, with variation in the diameter, $D_2$, of the top surface from 0 mm$\phi$ (conical form) to 18 mm$\phi$ (cylindrical form). The diameter of the bottom rod 12 is also 18 mm$\phi$. The results of the measurement are as shown in FIG. 2.

Figure 2:
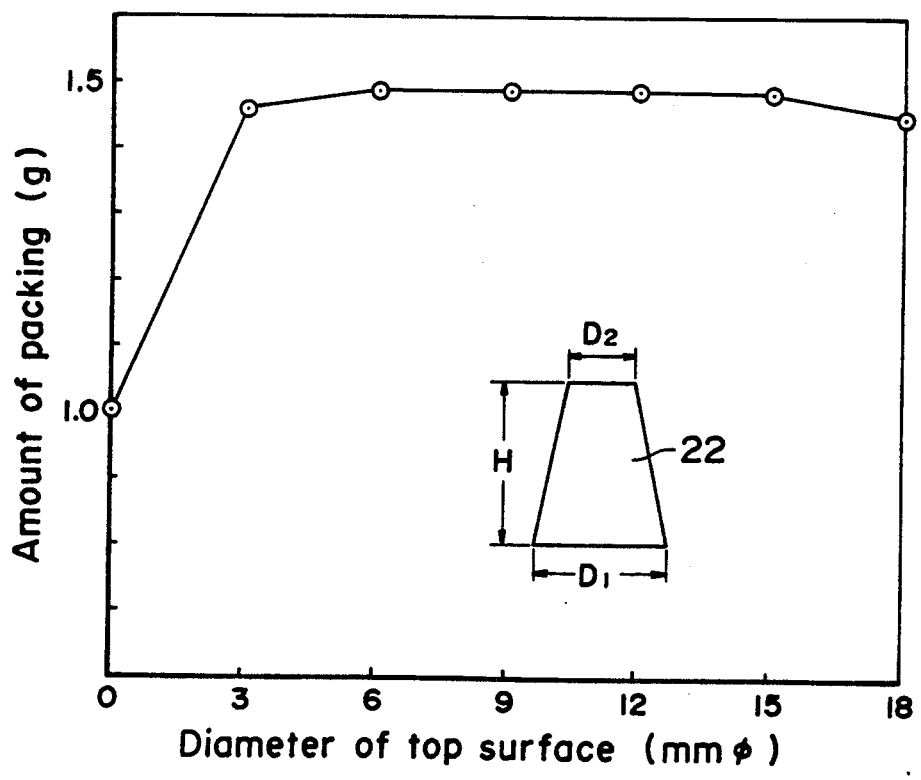
FIG. 2 is a graph showing a relationship between the shape of a magnetic pole and the amount of packing of a permanent magnet powder.

As shown in FIG. 2, the optimal range of the diameter, $D_2$, of the top surface is 3 mm$\phi$ or more. When a magnetic flux generated by a given current supplied to the solenoid coil 20 flows into the magnetic pole 22, a smaller cross-sectional area of the magnetic pole than 3 mm$\phi$ prevents the magnetic flux from entirely passing through the magnetic pole, with the result that part of the magnetic flux leaks outside the magnetic pole. For this reason, the amount of the magnetic flux supplied to the cylindrical molding space of the mold is reduced, and the force for attracting the permanent magnet powder into the molding space 18 becomes weak, which reduces the amount of packing of the powder. When the diameter, $D_2$, of the top surface exceeds 115 mm$\phi$, the gap between the solenoid coil and the upper part (around the inlet) of the magnetic pole becomes narrow, which brings about clogging in the case of some permanent magnet powders, particularly, in the case of a powder having poor flowability. This makes it difficult for the permanent magnet powder placed on the center of the top surface to fall down, so that the amount of the packed powder is reduced. For this reason, when the flowability of the powder is poor, it is preferred that the diameter, $D_2$, of the top surface of the magnetic pole 22 be such that $D_2 \leq 5D_1/6$.

An experimental example wherein a permanent magnet powder is packed according to the method of the present invention will now be described. A samarium-cobalt ($Sm_2CO_{17}$)—base alloy having an average particle diameter of 1000 $\mu$m was pulverized with a jet mill to have an average particle diameter of 3 $\mu$m. The powder of 1.5 g as a raw material thus prepared was weighed and packed into a cylindrical molding space having an outer diameter of 18 mm$\phi$, an inner diameter of 16 mm$\phi$, and a height of 15 mm by making use of the apparatus shown in the FIG. 1, and molding was conducted under a press molding pressure of 3 ton/cm$^2$. The results of the measurement on the packing time and the molding density are shown in Table 1. The conventional method shown in the Table was the combination of gravity dropping and press fitting, which comprises putting a powder into a sliding packing jig and conducting both of gravity drop wherein the powder is subjected to a reciprocating motion on a die to cause the powder to be dropped and packed into the molding space and forced press fitting with a push rod.

TABLE 1

|  | Sample | Density (g/cc) | Packing time (sec) |
|---|---|---|---|
| Method of the present invention | A | 4.5 | 4 |
|  | B | 4.6 | 5 |
|  | C | 4.6 | 4 |
|  | D | 4.5 | 5 |
|  | E | 4.6 | 3 |
|  | average | 4.56 |  |
|  | R | 0.1 |  |
|  | $\sigma_n$ | 0.05 |  |
| Conventional method | F | 4.1 | 60 |
|  | G | 4.2 | 70 |
|  | H | 3.9 | 60 |
|  | I | 3.8 | 60 |
|  | J | 4.1 | 70 |
|  | average | 4.02 |  |
|  | R | 0.4 |  |
|  | $\sigma_n$ | 0.15 |  |

In this Table, R represents a value (max, value minus min. value) and $\sigma_n$ represents standard deviation when n is 5.

As is apparent from Table 1, higher molding density and smaller standard deviation can be attained by the present invention. In particular, for the packing time of the powder, it is apparent that the present invention enables excellent packing to be attained in a very short time, i.e., a packing time of 1/10 or less of that of the conventional method.

Since the above-described significant effect of the present invention is mainly attributable to the magnetic properties of the powder, the same effect can be attained as far as the powder is a permanent magnet powder, i.e., when the powder is any of ferrite-base, alnico-base and neodymium-iron-boron-base magnet powders besides the above-described samarium-cobalt-base magnetic powder. It is needless to say that the method of the present invention can be applied to not only a powder for a sintered magnet and a cast magnet but also a powder for a bonded magnet (a powder blended with a resin).

The results of production of a bonded magnet according to the method of the present invention will now be described.

A samarium-cobalt ($Sm_2CO_{17}$)—base alloy having an average particle diameter of 1000 $\mu$m was pulverized with a jet mill to have an average particle diameter of 3 $\mu$m. The powder was molded in a magnetic field and subjected to sintering and aging treatments to prepare a raw material.

The sintered magnet as the raw material was pulverized by a jaw crusher and sieved to prepare a powder having a particle diameter of 120 $\mu$m or less. The permanent magnet powder was treated with a coupling agent and then mixed with an epoxy resin. This mixture was magnetized in a magnetic field of 20 kOe and granulated in an extrusion-granulator to prepare a granulated powder having a particle diameter of 400 to 800 μm.

The granulated powder was packed into the molding space 18 of the mold of the apparatus shown in FIG. 1, molded in a radially oriented magnetic field of 10 kOe under a pressure of 3 ton/cm² to prepare an annular bonded magnet having radial anisotropy.

The dimension of the molding space of the mold was 18 mmφ in outer diameter, 16 mmφ in inner diameter and 16 mm in height. The alternating current magnetic field applied during the packing of the granulated powder was 5 Oe or more, and the frequency was 10 Hz or more. The weight of the powder to be packed was 1.5 g on the average.

Thereafter, curing was conducted at 120° C. for 1 hr and subjected to 24-pole magnetization at 20 to 30 kOe by making use of a pulse magnetizer, which is known in the art.

For comparison, a bonded magnet was prepared by the conventional method through the use of the same powder for a bonded magnet as that used above. The conventional packing method was the combination of gravity dropping and press fitting, which comprises putting a powder into a sliding packing jig and conducting both gravity drop wherein the powder is subjected to a reciprocating motion on a die to cause the powder to be dropped and packed into the molding space, and press fitting with a push rod. Other conditions were the same as those of the above-described embodiment of the invention.

Various characteristics of the resultant bonded magnet are shown in Table 2.

TABLE 2

| | Sample | Density (g/cm³) | Average value of surface magnetic flux density (G) | Standard Deviation of surface magnetic flux density (G) | Packing time (sec) |
|---|---|---|---|---|---|
| Present invention | A | 6.80 | 2310 | 20 | 2-4 |
| | B | 6.75 | 2300 | 20 | 2-4 |
| | C | 6.75 | 2300 | 20 | 2-4 |
| Conventional method | D | 6.50 | 2210 | 250 | 60-120 |
| | E | 6.45 | 2200 | 200 | 60-120 |
| | F | 6.60 | 2250 | 300 | 60-120 |

As is apparent from Table 2, compared to the prior art method, the method of the present invention is superior in the density and surface magnetic flux density, reduces in the standard deviation of the surface magnetic flux density, and can remarkably shorten the packing time.

The permanent magnet powder used in the present invention may be of any of ferrite-base, alnico-base and neodymium-iron-boron-base magnet powders besides the above-described samarium-cobalt-base magnetic powder. Although a particularly significant effect can be attained even when the molding space is of a thin-wall cylindrical form or thin-wall planar form, the present invention can be applied to also any other form of the molding space.

As described above, the present invention provides a new technique for packing a permanent magnet powder in which a solenoid coil is disposed near the opening of a cylindrical molding space of a mold in such a manner that the central axis of the solenoid coil is aligned with a central axis of the cylindrical the molding space, and a truncated cone-shaped magnetic pole having a particular dimensional ratio is disposed along the central axis so that an alternating current magnet field is produced. Thus, a magnetic attraction acts on the permanent magnet powder to permit the permanent magnetic powder to be smoothly dropped, which enables the permanent magnet powder to be rapidly packed into the molding space by the magnetic attraction even when the opening of the molding space is very narrow. Accordingly, a very thin-wall cylindrical permanent magnet can be efficiently molded. The alternating current magnetic field which produces a "force" for packing the permanent magnet powder is collected in the central portion by the magnetic pole, which increases the magnetic flux density passed through the cylindrical molding space of the mold. Therefore, the permanent magnet powder can be effectively attracted and packed into the molding space even when the electric current is weak.

Further, in the present invention, since the permanent magnet powder is packed by the magnetic attraction without mechanically forcing the powder, the original shape of the powder is kept as it is. This makes the density distribution uniform and the weight of the molding constant, which enables mass production of a permanent magnet having uniform characteristics. Further, since the apparatus needs only a simple packing mechanism having a solenoid coil and a magnetic pole on the upper part of a mold, the present invention can be applied to any existing press molding and therefore can be used, regardless of the particle diameter and state of the powder, in various fields where a permanent magnet is prepared.

We claim:

1. A method of packing a permanent magnet powder comprising:

providing a mold having a cylindrical molding space with a central axis and an opening;

providing a solenoid coil having a central axis near said opening of said cylindrical molding space so that said central axis of said solenoid coil substantially coincides with said central axis of said mold space;

providing a magnetic pole means extending along said central axis of said solenoid coil;

supplying a permanent magnet powder above said opening of said molding space; and applying an alternating current magnetic field by said solenoid coil passing through at least part of said mold and molding space for packing said permanent magnet powder into said molding space.

2. A method of packing a permanent magnet powder as claimed in claim 1, wherein:

a tubular solenoid coil is provided.

3. A method of packing a permanent magnet powder as claimed in claim 1, wherein:

said permanent magnet powder is a powder for a sintered magnet.

4. A method of packing a permanent magnet powder as claimed in claim 1, and further comprising:

blending said permanent magnet powder with a resin for use in a bonded magnet.

5. A method of making a bonded magnet as claimed in claim 1 wherein:

said supplying a permanent magnet powder comprises placing in said solenoid coil a powder for a bonded magnet prepared by magnetizing a powder and granulating the magnetized powder through extrusion granulation;

said magnetic field is applied by applying an alternating current to said solenoid coil to pack said powder into said molding space; and said packed powder is subjected to compression molding.

6. A method of making a bonded magnet as claimed in claim 5, wherein:

after said alternating current magnetic field is applied, a magnetic field is applied during said compression molding to produce an anisotropic magnet.

7. A method of making a bonded magnet as calimed in claim 6, wherein:

after said magnetic powder is packed into said molding space, said powder in said molding space is molded in a radially oriented magnetic field to produce a radially oriented anisotropic toroidal magnet.

8. A method of packing a permanent magnet powder as claimed in claim 1 wherein:

said molding space comprises an annular cylindrical molding space;

said providing a magnetic pole means comprises providing on the central axis of said solenoid coil a truncated cone-shaped magnetic pole having a top surface and a bottom surface wherein the diameter of the top surface is at leat 1/6 or that of the bottom surface and the maximum diameter of the bottom surface is equal to the inner diameter of said annular cylindrical molding space; and said applying a magnetic field comprises applying an alternating current to said solenoid coil to generate said magnetic field passing through said magnetic pole thereby packing said permanent magnet powder above said opening of said cylindrical molding space into said molding space.

9. A method as claimed in claim 8, wherein:

said permanent magnet powder is a powder for a sintered magnet.

10. A method as claimed in claim 8, and further comprising:

blending said permanent magnet powder with a resin for use in a bonded magnet.

* * * * *